(12) United States Patent
Naderer et al.

(10) Patent No.: US 9,937,622 B2
(45) Date of Patent: Apr. 10, 2018

(54) METHOD FOR ROBOT-SUPPORTED STACKING OF OBJECTS

(71) Applicant: FerRobotics Compliant Robot Technology GmbH, Linz (AT)

(72) Inventors: Ronald Naderer, Sankt Florian (AT); Paolo Ferrara, Kematen an der Krems (AT)

(73) Assignee: FerRobotics Compliant Robot Technology GmbH, Linz (AT)

( * ) Notice: Subject to any disclaimer, the term of this patent is extended or adjusted under 35 U.S.C. 154(b) by 0 days.

(21) Appl. No.: 14/392,324

(22) PCT Filed: Jun. 27, 2014

(86) PCT No.: PCT/AT2014/050148
§ 371 (c)(1),
(2) Date: Dec. 24, 2015

(87) PCT Pub. No.: WO2014/205475
PCT Pub. Date: Dec. 31, 2014

(65) Prior Publication Data
US 2016/0184992 A1 Jun. 30, 2016

(30) Foreign Application Priority Data
Jun. 28, 2013 (DE) ........................ 10 2013 106 819

(51) Int. Cl.
*G06F 7/00* (2006.01)
*B25J 9/16* (2006.01)
(52) U.S. Cl.
CPC ... *B25J 9/1687* (2013.01); *G05B 2219/39194* (2013.01); *G05B 2219/40006* (2013.01)
(58) Field of Classification Search
USPC ........................................................ 700/218
See application file for complete search history.

(56) References Cited

U.S. PATENT DOCUMENTS

| 5,448,146 A | * | 9/1995 | Erlbacher | B25J 9/1633 318/568.17 |
| 2006/0259165 A1 | | 11/2006 | Stommen et al. | |
| 2014/0005831 A1 | * | 1/2014 | Naderer | B25J 9/1633 700/258 |

FOREIGN PATENT DOCUMENTS

| DE | 102010003697 | * | 10/2011 | ......... B24B 27/0038 |
| DE | 102011006679 A1 | | 9/2012 | |

* cited by examiner

*Primary Examiner* — Kyle O Logan
(74) *Attorney, Agent, or Firm* — Murphy, Bilak & Homiller, PLLC

(57) ABSTRACT

The invention relates to a method for positioning, in particular for palletizing, objects. The method is carried out using a manipulator having an additional actuator which is arranged between the manipulator and the object to be positioned. According to one example of the invention, the method comprises the gripping of the object and the moving of the object, using the manipulator, at a start position in the proximity of a storage surface on which the object is to be positioned and deposited. The method furthermore comprises the moving of the object using the manipulator to the storage surface, wherein the actuator is actuated such that the actuating force compensates for the weight of the object, or wherein the actuator force is regulated such that an adjustable, minimal net actuator force acts on an end stop of the actuator (which can be zero in the limiting case). Furthermore, the excursion of the actuator is monitored and a change to the excursion is detected. The movement of the manipulator is stopped upon detecting a change to the excursion of the actuator, whereupon the object can be released.

26 Claims, 4 Drawing Sheets

METHOD FOR ROBOT-SUPPORTED STACKING OF OBJECTS

Figure 1:
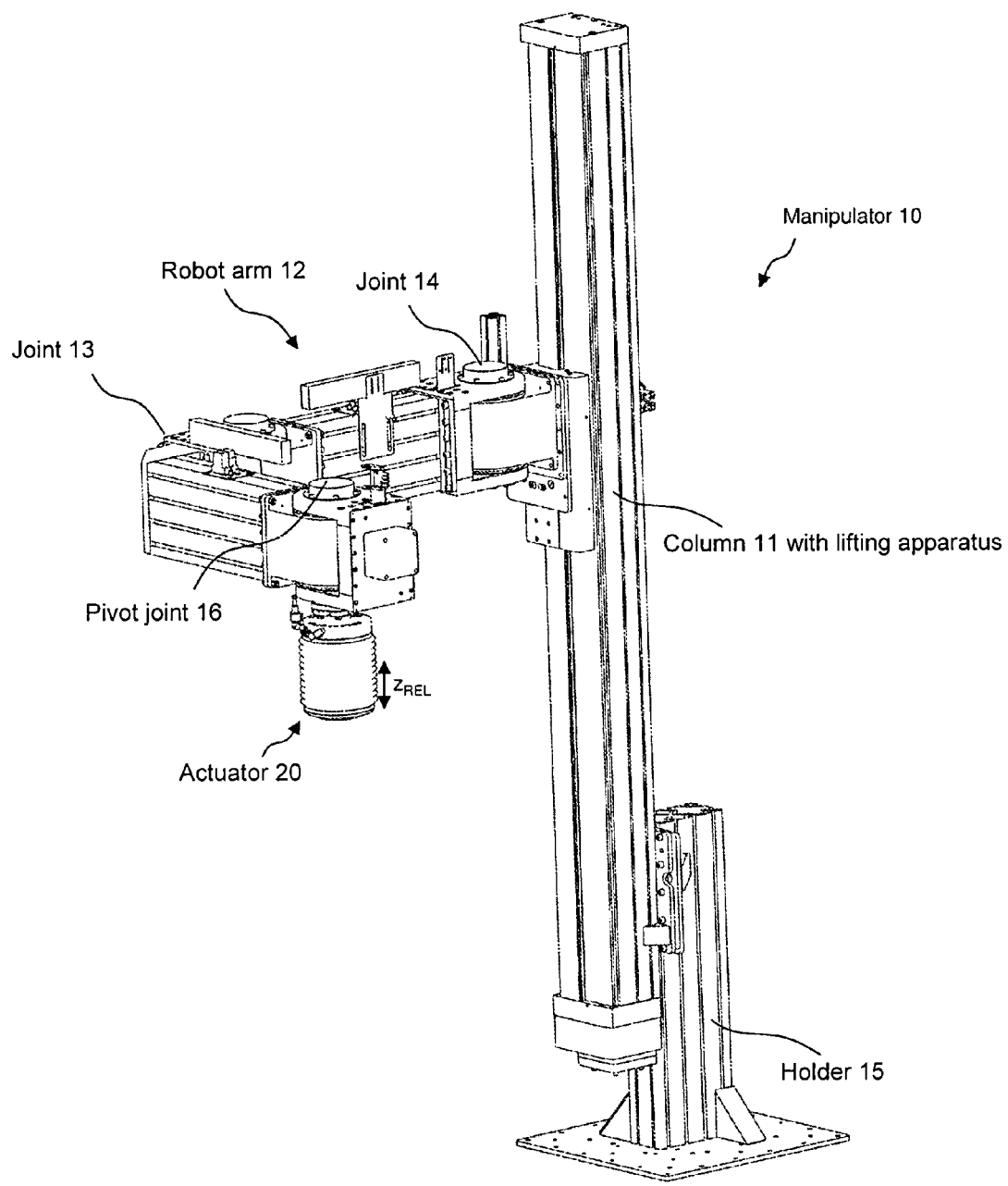

The invention relates to a robot-assisted method for positioning or stacking objects, for example for stacking workpieces by means of a manipulator.

The problem frequently arises in automated production of stacking a plurality of uniform or similar objects. For example, completed, optionally already packaged, objects are stacked on pallets for the purpose of transport or semi-finished workpieces are stacked at a (temporary) storage position to process them further at a later date. A similar task is the loading and unloading of boxes and crates with objects for the purpose of transport. Industrial robots having a plurality of degrees of freedoms (manipulators) and which are able to position objects practically as desired are used for this purpose in mass production.

A simple robot suitable for such purposes is described in the publication DE 40 18 684 C2. A pivotable arm, which is further divided and is variable in its length, is attached to a vertical column. A separate gripping apparatus for the object to be manipulated is attached to the end of the arm.

The robot control of an industrial robot is typically programmed so that the so-called "tool center point" (TCP) runs along predefined trajectories, planned in advance, whereby there are various methods for planning such motion paths. The planned trajectories and the tasks carried out along the paths (e.g. "pick tool" "release tool") are together referred to as a robot program. The robot program is normally adapted to the objects to be manipulated. The robot control thus needs to "know", e.g. when stacking objects, how high the object is in order to place the next object on the previous one. Assuming the first object (e.g. a box in which a product, for example a fragile object or a foodstuff is packaged) is placed on the ground, with the object (the box) being 20 cm high. The robot then has to position the next object such that its bottom side rests at a height of 20 cm above the ground before the object is released. The next object after that is then positioned 40 cm above the ground to place it on the previous one, and so on. In a similar manner, the robot needs to "know" the shape and the position of a housing or of a packaging when placing an object into the housing or into the packaging. Robots intended for such purposes are also known as "palletizing robots".

The description above outlines an ideal case in which the dimensions of the object to be positioned and/or stacked, and optionally the dimensions of the housing, are known and are strictly adhered to. If e.g. the actual height of an object differs from a specified dimension, when the manipulator places down the next object it may collide with the previous object (if its height is larger than the specified height) or the object may be released at too early a time and fall onto the previous one (if its height is smaller than the specified height). The tolerances of the individual objects add up during stacking. To avoid collisions, the robot program can be configured such that an object is always released at a specific distance above the level at which it should be placed down in the ideal case. In this case, the object will always fall a short distance, however. Dropping the objects over a short distance (some few mm) may not be a problem in many applications; however, there are some applications in which the objects to be manipulated have to be handled with care and a "gentle" manipulation of the objects is necessary. Such a "gentle" manipulation is not possible with conventional industrial robots (without complex and/or expensive additional sensor systems) because the robot control controls the manipulator such that the TCP runs along the (e.g. point-by-point defined) motion path to an exact end point (a specified position); the robot therefore always moves to (previously) defined deterministic positions and cannot take account of (random) deviations and tolerances in the objects to be manipulated.

The problem underlying the present invention is therefore to find a method which allows a "gentle" positioning or stacking of objects. The method should be robust with respect to variations in the actual dimensions and the destination positions of the objects. The objects should in particular be placed down on contact and should never be dropped. This problem is solved by a method in accordance with claim 1. Different embodiments of the method are the subject of the dependent claims.

A method for positioning, in particular palletizing, objects is described. The method is carried out by means of a manipulator having an additional actuator which is arranged between the manipulator and the object to be positioned. In accordance with one example of the invention, the method comprises the picking up of the object and the moving of the object, by means of the manipulator, to a start position close to a placement surface on which the object is to be positioned and placed down. The method further comprises the moving of the object by means of the manipulator toward the placement surface, with the actuator being controlled such that the actuator force compensates the weight of the object or with the actuator force being regulated such that an adjustable minimal net actuator force acts on an end stop of the actuator (and can be zero in a borderline case). The deflection of the actuator is furthermore monitored and a change of the deflection is detected. The movement of the manipulator is stopped upon detection of a change of the deflection of the actuator, whereupon the object can be released.

In accordance with a further example of the invention, the method comprises the controlling of the actuator such that the actuator force in the vertical direction corresponds to the weight force of the object; and it comprises the initiation of safety measures if the deflection of the actuator has changed by at least a predefinable value.

Further, an apparatus for positioning objects is described. In accordance with a further example of the invention, the apparatus comprises a manipulator having a robot arm movable in a horizontal plane and having a lifting apparatus which is configured to position the robot arm in the vertical direction. The apparatus further comprises an actuator which is arranged between the workpiece and the object to be positioned and a robot control which is configured to control the actuator such that the actuator force in the vertical direction approximately compensates the weight force of the object. The robot control is further configured to monitor the deflection of the actuator and to initiate safety measures as soon as this deflection exceeds a predefinable value.

Figure 2:
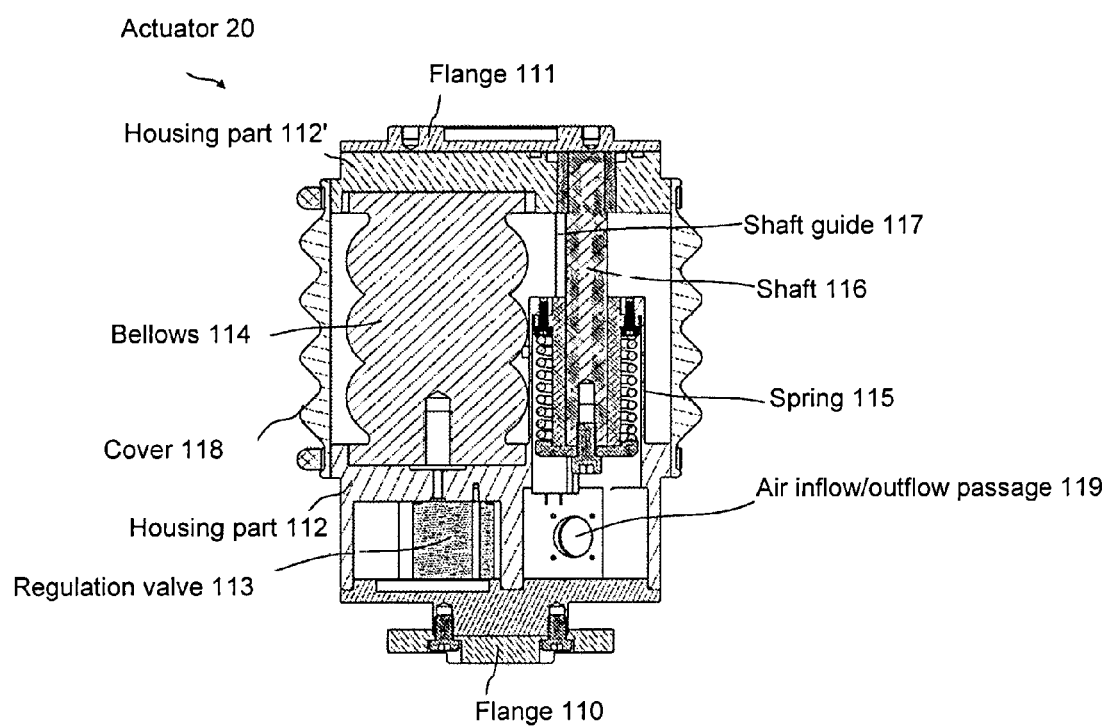
Figure 3:
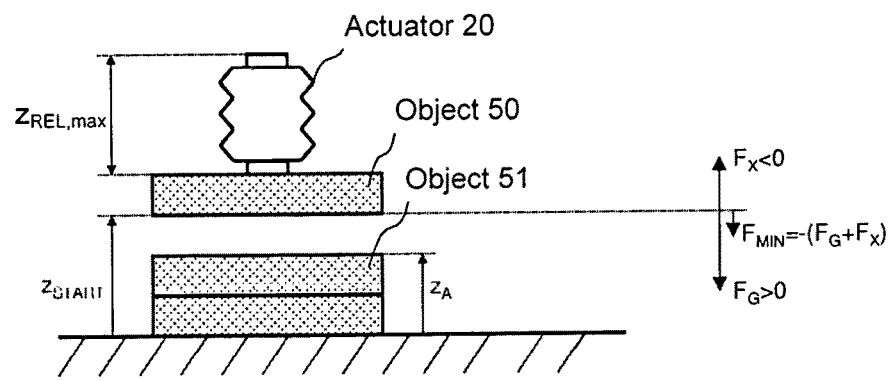
Figure 4:
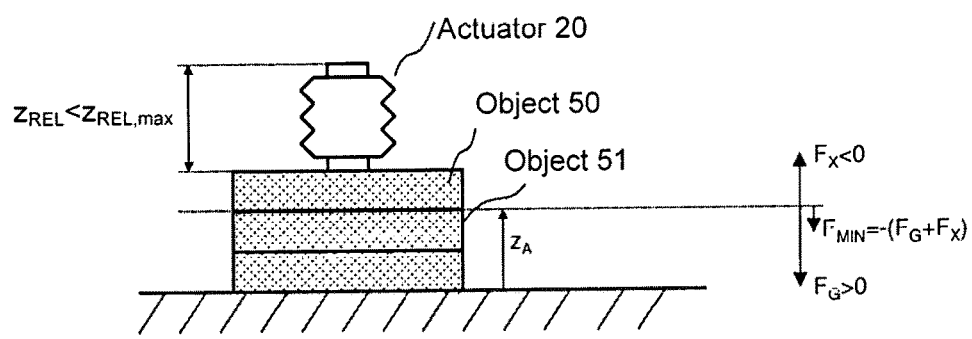
Figure 5:
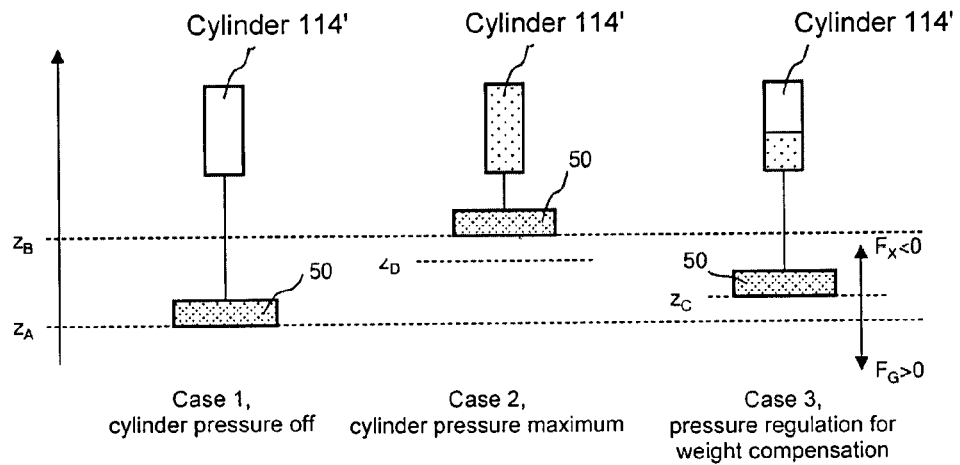
Figure 6:
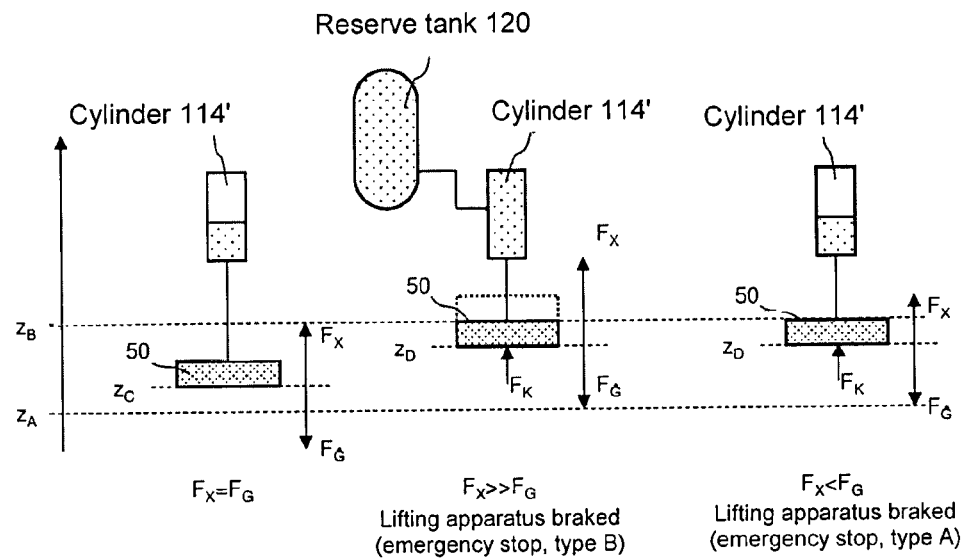

The invention will now be explained in more detail with reference to Figures. The Figures and the further description should help to better understand the invention. The details shown here are not necessarily to be understood as a restriction; instead importance is placed on explaining the principle underlying the invention. There are shown in the Figures:

FIG. 1 an example of an industrial robot which is suitable for stacking or positioning objects;

FIG. 2 an actuator which is arranged at the robot, is mechanically disposed between the robot and the object to be manipulated, and which allows a relative movement almost free of static friction between the robot and the object;

FIG. 3 schematically, a first part of a palletizing process;

FIG. 4 schematically, a second part of a palletizing process;

FIG. 5 a schematic representation of the pressure regulation for the weight force compensation by the actuator; and FIG. 6 a schematic representation of possible emergency-stop scenarios in accordance with the described embodiments.

The same reference numerals designate the same or similar components having the same or similar significance.

An example of a manipulator (robot) is shown in FIG. 1 which is suitable for coping with the previously mentioned stacking and positioning work. The manipulator 10 comprises a robot arm 12 which can be moved up and down in the vertical direction along a fixed column 11 by a lifting apparatus. In the present example, the column is firmly connected to a holder 15 which can, in turn, be firmly anchored on the floor or to a foundation. In the present example, the robot arm 12 comprises two joints 13 and 14, with the robot arm being connected to the lifting apparatus in an articulated manner via the joint 14. The joint 13 connects two segments of the robot arm (upper arm or proximal segment, lower arm or distal segment). The joints 13 and 14 are designed such that the arm can carry out a movement in a horizontal plane. The vertical position of this horizontal plane can be fixed by the lifting apparatus. An actuator 20 is mounted on the end of the robot arm opposite the joint 14 and can—to a small extent—carry out a vertical movement $z_{REL}$ relative to the robot arm. The actuator 20 can optionally also be rotatably connected to the robot arm 12 in an articulated manner such that the actuator 20 is rotatable about its own (longitudinal) axis (pivot joint 16). The actuator 20 connects a tool (e.g. a gripper) to the robot arm, with the vertical position $z_{REL}$ of the tool relative to the robot arm (deflection of the actuator) being adjustable by means of the actuator 20.

The actuator 20 is, in particular, free of static friction, whereas free of static friction in, in this connection, understood to mean that that the static friction force acting between the movable parts of the actuator is negligibly small, in particular smaller than 5% of the effective actuator force. The actuator force is the force exerted by the actuator 20 on the tool (e.g. the gripper).

The actuator 20 is a linear actuator which can e.g. be configured as an electrical direct drive or also as a pneumatic actuator. With pneumatic actuators, the use of actuators free of (static) friction or almost free of friction such as bellows cylinders or air muscles can be considered which e.g. work against a spring element which effects a restoring force. The actuator 20 can also have a dual-action pneumatic cylinder. In this case, no spring is necessary for exerting a restoring force. The static friction acting between the movable parts of the actuators is problematic in positioning work—and in particular in the stacking of objects. A bellows cylinder or an air muscle itself does not have any static friction since no parts moving with respect to each other have to slide on one another. A negligible static friction in the cylinder can also occur with pneumatic cylinders. That is, with a maximum actuator force of 200 Newtons, the force required to overcome the static friction (e.g. at a static friction of 1% of the maximum force) amounts to just 2 Newtons. Actuators with such a small static friction are called actuators "free of static friction". Conventional actuators exhibit about 20 times more static friction. In order to also avoid (significant) static friction in the bearings, the actuator can e.g. have recirculating ball bearings. The practical freedom of the actuator from static friction is of great advantage for a precise force regulation. A friction force higher by one Newton would, in the above example, result in an approximately 10 Newton greater inaccuracy in the dynamic force regulation (i.e. at the varying positions of the actuator). An exact force regulation is required to allow a placing down of the object to be positioned (or to be stacked) which is as gentle as possible and to avoid shocks to the greatest possible extent.

FIG. 2 shows a sectional representation of an exemplary embodiment of the actuator 20 of FIG. 1. In the present case, the actual adjustment element is a compressed air-driven bellows cylinder 114 which works against a spring 115. The actuator 20 comprises a first flange part 110 as an interface to the industrial robot (manipulator) and a second flange part 111 at which a gripper can, for example, be arranged. A housing part 112 is rigidly connected to the first flange part 111 and both a regulation valve 113 and a static friction free shaft guide (shaft 116, (recirculating ball) shaft guide 117) with the restoring spring 115 are arranged in said housing part. A bellows 118 is provided as a cover between the flange parts 110 and 111 for protection against dust and other contaminants. This cover can also be configured as liquid-tight and/or dust-tight for use in a rough environment. The bellows cylinder 114 serves as a gearless adjustment element free of static friction. The adjustment element acts between the first housing part 112 and a second housing part 112' rigidly connected to the holder 111. To allow force regulation, the actuator comprises a path sensor (not shown or covered by the shaft guide 117) and a pressure sensor. The actuator force can be calculated by measuring the pressure in the bellows cylinder and by the position of the bellows cylinder (by means of the path sensor). Since the kinematics of the robot are known, the force exerted on the object to be manipulated can also be determined (and consequently also regulated) via the measured parameters. Connections for the air inflow and outflow ducts 119 can e.g. be arranged in the first housing part 112. The connection to the air inflow duct is e.g. connected to a compressor via a hose.

Regardless of its actual implementation, the actuator 20 comprises two end stops. The first end stop defines the minimal deflection ($z_{REL}=0$) of the actuator 20 and the second end stop defines the maximum deflection ($z_{REL}=z_{REL,max}$) of the actuator 20. The maximum deflection $z_{REL,max}$ can, for example, be 100 mm and typically lies between 50 mm and 250 mm.

Reference is made to FIGS. 3 and 4 in the following. The workpiece (object 50) to be positioned is first moved by means of the manipulator (e.g. the manipulator 10 in accordance with FIG. 1) to a start position $z_{START}$ for a positioning task, i.e. to position or palletize (stack) objects. This start position $z_{START}$ is located in the vicinity of the desired placement position $z_A$ at which the workpiece 50 should come to rest at the end. In a palletizing process, this start position $z_{START}$ is above the desired placement position $z_A$ in a vertical direction, with the vertical distance ($z_{START}-z_A$) between the start position $z_{START}$ and the placement position $z_A$ essentially being a safety distance which has to be observed in order not to risk colliding with the already stacked objects. The actuator 20 which is arranged between the workpiece 50 and the manipulator 10 is located in its end position with a maximum deflection $z_{REL,max}$ in this phase of the positioning process, with the actuator 20 pressing against the end stop with an (adjustable) minimal force $F_{MIN}$. This (negative) minimal force $F_{MIN}$ is selected in this respect to be as small as possible, typically in ranges from −10 to −1

Newton. The weight force $F_G$ of the object in this respect has to be almost completely (except for the named minimal force $F_{MIN}$) compensated by the actuator. This situation is shown in FIG. 3. The actuator pulls the workpiece 50 upward with a (negative) force $F_X$, while the (positive) weight force of the object 50 acts downwardly. Here $F_X = -(F_G + F_{MIN})$, i.e. the net force acting on the end stop of the actuator 20 is the above-mentioned minimal force $F_{MIN} = -(F_G + F_X)$. The balance between the actuator force $F_X$ and the weight force $F_G$ can also be disturbed by forces arising from the acceleration of the manipulator 10. This disturbing force can, optionally, be measured or calculated and taken into account accordingly. The corresponding information (e.g. position data and their first and second derivations) are known to the robot control of the manipulator.

Once the workpiece 50 has been brought into the start position $z_{START}$, the placement process can begin. For this purpose, the manipulator 10 is controlled such that the actuator 20 together with the workpiece is moved from the start position $z_{START}$ toward the placement position $z_A$, with the actuator 20 still (only) pressing against the end stop with the minimal net force $F_{MIN}$ and having full deflection $z_{REL,max}$. The speed v is adjustable and at a constant speed the current position z(t) of the workpiece 50 is equal to $z_{START} - v^*t$ (where the speed v is a positive value and $z_{(t=0)} = z_{START}$).

At the time $t_A$ at which the workpiece reaches the placement position $z_A$, the workpiece 50 contacts the workpiece 51 (or generally the desired placement surface) disposed thereunder. Due to the movement of the manipulator 10 (and thus of the actuator 20 and of the workpiece 50), the actuator 20 is compressed directly after contact between the workpiece 50 and the placement surface at position $z_A$ and the net actuator force $F_{MIN}$ no longer acts on the end stop, but on the placement surface (e.g. the upper side of the workpiece 51). The deflection $z_{REL}$ of the actuator 20 simultaneously decreases ($dz_{REL}/dt < 0$). The robot control does not have to know the actual placement position zA nor does the placement position $z_A$ have to be measured. A change of the deflection can be evaluated for the contact recognition. For example, an evaluation of the in equation $dz_{REL}/dt <=$ or $z_{REL} < z_{REL,max}$ can take place in order to recognize the contact between the workpiece 50 and the placement surface. Since both the position of the manipulator 10 and the deflection $z_{REL}$ are known at this time, this information can be used to gauge unknown objects or to recognize their dimensions (e.g. the vertical coordinate of the contacted surface). A "resilience" or "stiffness" of the contacted object can be recognized from the combination of different minimal forces $F_{MIN}$ and the arising deflection $z_{REL}$ after contact. This e.g. allows the recognition of an unstable (and therefore resilient) placement surface, for example, if, in a stack of boxes, the lower box on which another is to be placed is damaged. The determination of the resilience can take place upon contact between the object to be positioned and the placement surface (that is, upon placing down) or upon contact between the object to be picked up and the actuator (that is, upon gripping).

As soon as the contact (i.e. the placing down of the workpiece 50) has been recognized, the movement of the manipulator 10 is stopped, whereby the speed v need not be set to zero abruptly, but may instead be slowly reduced to zero in order to reduce the dynamic forces. The time available for braking the manipulator 10 is essentially determined by the maximum stroke $z_{REL,max} - z_{REL,min}$ of the actuator 20. The force regulation of the minimal net actuator force $F_{MIN}$ is active during the entire placement process.

This situation is shown in FIG. 4. It is ensured in this manner that, in the phase from the first contact between the actuator 20 and the workpiece up to the stopping of the manipulator 10, a force is never exerted on the workpiece by the manipulator which is higher than the (adjustable) minimum force $F_{MIN}$.

At the end of the placement process, as soon as the manipulator 10 is stationary and the deflection of the actuator 20 is constant again, the weight of the workpiece 50 is transferred to the placement surface. This means that the net actuator force is increased until the actuator force $F_X$ is zero and the net actuator force is equal to the weight force $F_G$. The force regulation can then (while maintaining the current deflection $z_{REL}$ of the actuator 20) be switched off and the workpiece can be released. Subsequently, the actuator 20 is moved by a further reduction of the deflection $z_{REL}$ and/or by a movement of the manipulator away from the placed workpiece and the next workpiece can be picked up.

The described process offers the advantage that only the start position $x_{START}$ of the robot control (of the manipulator 10) has to be known. This can be easily calculated if, for example, the maximum dimension (height) of the workpiece 50 is known as well as the number of workpieces already placed down plus a possible safety distance. A collision is thus prevented even in the case of comparatively large tolerances of the dimensions of the workpieces. The actual placement position $z_A$ (e.g. the current height of the stack) does not have to be known to the robot control and therefore also does not have to be measured. The detection of the actual placement position takes place by means of the actuator 20 whose deflection $z_{REL}$ is monitored, whereby the net actuator force $F_{MIN}$ is regulated to a value close to zero before placing down the workpiece at its placement position $z_A$ to keep the impact forces upon contact as small as possible. It can be important in this connection that the actuator 20 is practically free of static friction, that is no significant slip-stick effect occurs during a change of the actuator position $z_{REL}$ (e.g. upon compression of the actuator).

Even if the contact forces are kept very small by means of the above-described actuator (actuator 20, FIGS. 1 to 4), it may be possible with some applications to provide safety measures which e.g. prevent an unwanted squeezing of objects or persons if an unplanned collision occurs between a workpiece manipulated by the robot (workpiece 50, FIGS. 3 to 6) and another object or a body part of a person. The dimensions of an object can also lie outside a certain tolerance. In addition to avoiding damage, the higher ranking control can also then also receive a message (signal) about this.

Three different states of the actuator burdened with a workpiece 50 (weight force $F_G$) are shown in FIG. 5. The actuator 20 (see FIGS. 1 to 4) is represented in this illustration by a pneumatic cylinder 114' which can be used alternatively to the bellows 114 (see FIG. 2). The cylinder is operated such that the workpiece 50 is raised when the cylinder pressure $p_z$ exceeds a minimum value $p_M$. The example marked by "Case 1" in FIG. 5 shows the case of a pressure drop in the cylinder 114' of the actuator 20 (actuator force $F_X = 0$). As a consequence of this, the weight (weight force $F_G$) of the workpiece 50 pulls the actuator into the lower end position, marked by $z_A$ in FIG. 5. The example marked by "Case 2" in FIG. 5 shows the case of an "excess pressure" ($p_Z > p_M$) in the cylinder 114' of the actuator 20 (actuator force $F_X > F_G$). As a consequence of this, the actuator pulls the workpiece 50 (weight force $F_G$) up to the lower end position of the actuator 20, marked by $z_B$ in FIG. 5. The example marked by "Case 3" in FIG. 5 shows the (normal) case of weight compensation. This means that the cylinder pressure $p_Z$ is regulated to that pressure $p_M$ which is required as a minimum to compensate the weight force $F_G$ of the workpiece (actuator force $F_X$ is equal to the weight force $F_G$). The workpiece hovers, so to speak, at a (predefinable) specified position $z_C$. It must be noted in this connection that the positions $z_A$, $z_B$, $z_C$ and $z_D$ shown in FIG. 5 do not represent any absolute positions of the workpiece 50, but rather deflections of the actuator 20. The absolute position of the workpiece 50 is determined by the position of the manipulator 10 (see FIG. 1) on which the deflection of the actuator 20 is superposed. In the "case 3" shown in FIG. 5, the specified position $z_C$ is therefore to be understood as a relative position with respect to the position predefined by the manipulator (cf. FIG. 1).

Two different safety measures are shown in FIG. 6 which can be carried out in different situations in order, for example, to prevent (excessive) squeezing of a person or of an item. In the illustration on the left in FIG. 6, the normal case of weight compensation is shown again. The workpiece 50 is positioned by means of the manipulator 10 (see FIG. 1) and the actuator 20 provides a "hovering" of the workpiece 50 on an actuator deflection $z_C$ (actuator force $F_X$ equal to weight force $F_G$, no static friction). If the workpiece 50 collides with an obstacle upon lowering of the workpiece 50 (for example as part of a stacking process or of a positioning task as described further above), a collision force $F_K$ acts on the workpiece 50 which "compresses" the actuator 20; the deflection z of the actuator 20 therefore becomes smaller ($z < z_C$). The workpiece 50 is raised relative to the actuator 20; the movement of the workpiece 50 is blocked by the obstacle while the manipulator 10 continues to move. As soon as the actuator deflection falls below a minimum deflection $z_D(z < z_D)$, a safety measure is carried out, for example an emergency stop.

In accordance with the examples of the invention described here, at least two measures can be distinguished, namely an emergency stop of the manipulator 10 and of the actuator 20 during a slow vertical movement of the manipulator 10 (emergency stop type A) and during a fast vertical movement of the manipulator 10 (emergency stop type B). In both cases, the power supply for the motors of the manipulator 10 is interrupted and the brakes (where present) of the lifting apparatus (cf. FIG. 1 column 11) engage immediately. In the case of a slow manipulator movement, the braking distance is short, for example 1 mm, whereas the braking distance can be significantly longer (e.g. 9 mm) in the case of a fast (maximum) manipulator movement. The actuator 20 also has to absorb this braking path, whereby the former is further compressed. The difference between a "critical deflection" $z_D$ of the actuator, upon which the safety measure (emergency stop type B) is carried out and the minimum deflection $z_B$ of the actuator therefore has to be (configured) larger than the maximum braking distance.

Further, in the case of only a slow vertical movement of the manipulator 10 (emergency stop type A), the valves of the pneumatic adjustment element in the actuator 20 (in the present case the valves of the cylinder 114') are blocked and the workpiece is only lowered slowly due to the leakage in the cylinder 114' (e.g. less than 50 mm/s). A wedged in person thereby has sufficient time to react. In the case of a fast vertical movement of the manipulator 10 (emergency stop type B), the air inflow passage of the cylinder is switched to a reserve tank 120 filled with compressed air. In the case of a switch-off of power, this can take place, e.g. automatically by means of a spring. The compressed air in the reserve tank is sufficient to lift the weight up to the upper end stop (minimal deflection $z_B$ of the actuator) and to hold it for around 1 minute despite a leakage in the cylinder. The difference between a "critical deflection" $z_D$ of the actuator, upon which the emergency stop of type B is carried out, and the minimal deflection $z_B$ of the actuator is, in this case, considerably larger than the maximum braking distance of the manipulator 10, so that the workpiece is effectively raised (against the movement of the manipulator upon braking) in case of an emergency. Given a difference ($z_B - z_D$) of 25 mm and a braking distance of 9 mm, the workpiece 50 would be effectively raised by 16 mm. The raising in this case takes place at a higher speed than the maximum speed of the manipulator 10 during braking.

To restart operations, the normal operating pressure is again applied to the actuator, whereby the workpiece is raised; the manipulator 10 can then raise the workpiece 50 further and optionally move back to a start position or continue the process interrupted by the emergency stop.

The invention claimed is:

1. A method for positioning an object by means of a manipulator having an actuator which is arranged between the manipulator and the object to be positioned, the method comprising:
   picking up the object and moving the object, by means of the manipulator, to a start position in the vicinity of a placement surface on which the object is to be positioned and placed down;
   moving the object by means of the manipulator towards the placement surface, with the actuator being controlled such that an actuator force of the actuator compensates a weight force of the object or with the actuator force being regulated such that an adjustable minimal net actuator force acts on an end stop of the actuator;
   monitoring a deflection of the actuator and detecting a change of the deflection;
   stopping movement of the manipulator upon detection of a change of the deflection of the actuator;
   releasing the object; and
   reducing the actuator force before the release of the object, such that the net actuator force is determined by the weight force of the object.

2. The method of claim 1, wherein the actuator force is reduced to zero before the release of the object.

3. The method of claim 1, wherein acceleration forces effected by the movement of the manipulator are taken into account on the regulation of the net actuator force.

4. The method of claim 1, wherein the actuator is nearly free of static friction.

5. The method of claim 1, wherein the movement of the manipulator is stopped when the deflection of the actuator has changed by a first predefined value.

6. The method of claim 5, further comprising:
   initiating one or more safety measures when the deflection of the actuator has changed at least by a predefined second value.

7. The method of claim 6, wherein the actuator is a pneumatic actuator, and wherein, as a safety measure, the manipulator is braked and an air inflow passage of the pneumatic actuator is connected to a compressed air source, whereby the actuator carries out a movement which at least partly compensates the movement of the manipulator during the braking process.

8. The method of claim 6, wherein the actuator is a pneumatic actuator and wherein, as a safety measure, the pneumatic actuator is blocked by means of valves so that a movement is only possible due to leakage in the actuator.

9. The method of claim 1, wherein during the picking up or positioning of the object, a contact is recognized between the actuator and the object or between the object and the placement surface by detection of a change of the deflection, and a dimension of the object is determined from the deflection and the position of the manipulator on contact.

10. The method of claim 9, wherein deviations from a specified dimension of the object are determined from the deflection and the position of the manipulator on contact.

11. The method of claim 10, further comprising:
indicating when a deviation from a specified dimension of the object exceeds a predefined value.

12. The method of claim 1, wherein during the picking up or positioning of the object, a contact is recognized between the actuator and the object or between the object and the placement surface by detection of a change of the deflection, and a resilience or stiffness of the object or of the placement surface is determined from the deflection and the actuator force.

13. The method of claim 1, wherein the picking up of the object comprises:
monitoring the deflection of the actuator and detecting a change of the deflection; and
stopping the movement of the manipulator upon contact between the actuator and the object, wherein recognition of the contact takes place by detection of a change of the deflection of the actuator.

14. An apparatus for positioning objects, comprising:
a manipulator comprising a robot arm movable in a horizontal plane and a lifting apparatus configured to position the robot arm in the vertical direction;
an actuator arranged between a workpiece and an object to be positioned; and
a robot control configured to control the actuator such that an actuator force of the actuator in the vertical direction approximately compensates a weight force of the object, wherein the actuator force is reduced before a release of the object, such that the net actuator force is determined by the weight force of the object, and to monitor a deflection of the actuator and to initiate one or more safety measures responsive to the deflection exceeding a predefined value.

15. A method for positioning an object by means of a manipulator having an actuator which is arranged between the manipulator and the object to be positioned, the method comprising:
picking up the object and moving the object, by means of the manipulator, to a start position in the vicinity of a placement surface on which the object is to be positioned and placed down;
moving the object by means of the manipulator towards the placement surface, with the actuator being controlled such that an actuator force of the actuator compensates a weight force of the object or with the actuator force being regulated such that an adjustable minimal net actuator force acts on an end stop of the actuator;
monitoring a deflection of the actuator and detecting a change of the deflection;
stopping movement of the manipulator upon detection of a change of the deflection of the actuator; and
releasing the object,
wherein during the picking up or positioning of the object, a contact is recognized between the actuator and the object or between the object and the placement surface by detection of a change of the deflection, and a dimension of the object is determined from the deflection and the position of the manipulator on contact,
wherein deviations from a specified dimension of the object are determined from the deflection and the position of the manipulator on contact.

16. The method of claim 15, further comprising:
indicating when a deviation from a specified dimension of the object exceeds a predefined value.

17. The method of claim 15, wherein during the picking up or positioning of the object, a contact is recognized between the actuator and the object or between the object and the placement surface by detection of a change of the deflection, and a resilience or stiffness of the object or of the placement surface is determined from the deflection and the actuator force.

18. The method of claim 15, wherein the picking up of the object comprises:
monitoring the deflection of the actuator and detecting a change of the deflection; and
stopping the movement of the manipulator upon contact between the actuator and the object, wherein recognition of the contact takes place by detection of a change of the deflection of the actuator.

19. The method of claim 15, further comprising:
reducing the actuator force before the release of the object, such that the net actuator force is determined by the weight force of the object.

20. The method of claim 15, wherein the actuator force is reduced to zero before the release of the object.

21. The method of claim 15, wherein acceleration forces effected by the movement of the manipulator are taken into account on the regulation of the net actuator force.

22. The method of claim 15, wherein the actuator is nearly free of static friction.

23. The method of claim 15, herein the movement of the manipulator is stopped when the deflection of the actuator as changed by a first predefined value.

24. The method of claim 23, further comprising:
initiating one or more safety measures when the deflection of the actuator has changed at least by a predefined second value.

25. The method of claim 24, wherein the actuator is a pneumatic actuator, and wherein, as a safety measure, the manipulator is braked and an air inflow passage of the pneumatic actuator is connected to a compressed air source, whereby the actuator carries out a movement which at least partly compensates the movement of the manipulator during the braking process.

26. The method of claim 24, wherein the actuator is a pneumatic actuator and wherein, as a safety measure, the pneumatic actuator is blocked by means of valves so that a movement is only possible due to leakage in the actuator.

* * * * *